United States Patent [19]

Conner

[11] Patent Number: 4,623,469

[45] Date of Patent: Nov. 18, 1986

[54] METHOD FOR RENDERING HAZARDOUS WASTES LESS PERMEABLE AND MORE RESISTANT TO LEACHING

[75] Inventor: Jesse R. Conner, Atlanta, Ga.

[73] Assignee: Chem-Technics, Inc., Atlanta, Ga.

[21] Appl. No.: 705,667

[22] Filed: Feb. 26, 1985

Related U.S. Application Data

[63] Continuation-in-part of Ser. No. 532,614, Sep. 15, 1983, abandoned.

[51] Int. Cl.$^4$ ............................................. C02F 11/14
[52] U.S. Cl. ................................. 210/751; 210/746; 210/747; 210/911; 106/76; 106/83; 252/628; 405/129
[58] Field of Search .................... 106/76, 83; 210/724, 210/727, 728, 730, 732, 746, 747, 751, 911; 252/628; 405/128, 129

[56] References Cited

U.S. PATENT DOCUMENTS

| | | |
|---|---|---|
| 1,598,636 | 9/1926 | Bartlett .................................. 106/76 |
| 1,889,437 | 11/1932 | Lange ..................................... 106/76 |
| 3,226,318 | 12/1965 | Schick ................................... 210/751 |
| 3,305,894 | 2/1967 | Boden et al. ............................. 18/12 |
| 3,591,542 | 7/1971 | Bonnel et al. ....................... 260/29.4 |
| 3,837,872 | 9/1974 | Conner ................................... 106/76 |
| 3,841,102 | 10/1974 | Cinner et al. ........................ 210/170 |
| 3,893,656 | 7/1975 | Opacic et al. ....................... 210/199 |
| 3,971,732 | 7/1976 | Meier ............................... 252/301.15 |
| 3,988,258 | 10/1976 | Curtiss et al. ............... 252/301.1 W |
| 4,009,116 | 2/1977 | Bahr ............................. 252/301.1 W |
| 4,010,108 | 3/1977 | Gablin et al. ............... 252/301.1 W |
| 4,012,320 | 3/1977 | Conner et al. ....................... 210/751 |
| 4,019,628 | 4/1977 | Derby ................................. 206/524.4 |
| 4,056,362 | 11/1977 | Gablin et al. ........................ 137/567 |
| 4,060,425 | 11/1977 | Harada et al. ......................... 106/90 |
| 4,077,901 | 3/1978 | Arnold et al. ............... 252/301.1 W |
| 4,084,981 | 4/1978 | Higuchi et al. ........................ 106/96 |
| 4,174,293 | 11/1979 | Colombo et al. ........... 252/301.1 W |
| 4,196,169 | 4/1980 | Gablin et al. ........................ 422/159 |

FOREIGN PATENT DOCUMENTS 1246848 2/1961 France ................................. 210/751

OTHER PUBLICATIONS

Chemical Abstracts, vol. 70, 1969 6447t.
Chemical Abstracts, vol. 84, 1976, 78852h.

Primary Examiner—Ernest G. Therkorn
Attorney, Agent, or Firm—Jones & Askew

[57] ABSTRACT

A method for treating liquid and semi-liquid wastes to render them fit for ultimate disposal, by first determining the ionic charge of the waste counter ions. An appropriate suspension of emulsified asphalt particles is then selected having an opposite particle charge to the ionic charge of the waste counter ions. The waste is then mixed with the selected suspension of emulsified asphalt particles at ambient temperature in an amount sufficient to react with the waste counter ions and coalesce into a hydrophobic mass.

11 Claims, No Drawings

METHOD FOR RENDERING HAZARDOUS WASTES LESS PERMEABLE AND MORE RESISTANT TO LEACHING

RELATED CASES

This is a continuation-in-part of Ser. No. 532,614 filed Sept. 15, 1983, now abandoned.

TECHNICAL FIELD

The present invention generally relates to waste treatment, and specifically relates to a method for treatment of hydrophilic liquid and semi-liquid waste with emulsified asphalt and optionally other solidification additives to render the wastes hydrophobic and impermeable to water.

BACKGROUND

The processing of hazardous or offensive waste materials produced by municipalities and industries has reached critical importance in modern-day society. Concern for the quality of life and the environment have compelled governmental agencies to promulgate legislation to ensure that future generations will not suffer from the excessive wastes of our present day society. Under the regulations which implement these governmental edicts, waste must be discarded in a fashion which is non-offensive and presents little or no threat to the air, water and land upon which the waste is ultimately disposed. The United State Congress in 1976 enacted Subtitle C of the Resource Conservation and Recovery Act (RCRA), Pulic Law 94-580, for the purpose of instituting a national hazardous waste control program similar in function to the previously promulgated Air Pollution and Water Pollution Control programs.

The United States Environmental Protection Agency, charged with the responsibility for implementing and supervising the hazardous waste control program called for under RCRA, promulgated in 1980 a series of regulations which require that certain sludges, slurries and other liquid wastes containing specified hazardous materials may no longer be deposited in landfills without pre-treatment, stabilization, and dewatering. Wastes must additionally have acceptable toxicity levels as measured by certain established tests before they can be discarded in a landfill. One primary objective of these governmental requirements is to achieve a non-flowing consistency of the waste by reduction of the liquid content or increase of the solid content to eliminate the presence of free liquids prior to final disposal in the landfill. The end result of this and other similar legislation and regulations is that many liquid or semi-liquid wastes containing hazardous materials will require dewatering, chemical fixation, solidification, or some combination thereof, prior to ultimate disposal.

Chemical fixation and solidification processes have found recent favor for detoxifying hazardous materials and for producing solid wastes having physical properties suitable for ultimate disposal in landfills, ocean dumping, etc. For example, U.S. Pat. No. 3,837,872 discloses a method for treating liquid wastes by adding an aqueous solution of an alkali metal silicate and a silicate setting agent, which converts the waste into a chemically and physically stable solid product. The patent to Thompson, U.S. Pat. No. 3,980,558, discloses a method for treating liquid wastes by adding a solidification agent consisting essentially of hydraulic cement.

The terminology of chemical fixation and solidification has not been consistent in the prior art due primarily to the fact that until recently most of the waste treatment systems offered were considered proprietary. Such terms as "encapsulation", "crystal capture", and "pseudo mineral" often appear in the prior art instead of discussions concerning the operations of such systems, most likely because the actual chemical reactions involved are complex and not completely understood.

There is also a tendency in the prior art to confuse the terms "chemical fixation", "stabilization", and "solidification". "Stabilization" is essentially a pretreatment process which alters wastes to prevent further chemical reactions, e.g., the use of lime in biological sludges to kill or inactivate micro-organisms so that the sludge will not undergo further biological decomposition. "Chemical fixation" refers to the chemical technology used to destroy, de-toxify, immobilize, insolubilize, or otherwise render a waste component less hazardous or less capable of finding its way into the environment. The term often denotes a chemical reaction between one or more waste components in a solid matrix, either introduced deliberately or preexisting in the waste. For example, the ion exchange of heavy metals within the alumino-silicate matrix of a cementitious solidification agent is a chemical fixation. There is a wide variety of chemical fixation techniques known in the art for preparing waste residues for solidification, encapsulation or disposal without solidification.

The term "solidification" is the transformation of a waste residue into a solid physical form which is more suitable for storage, burial, transportation, ocean disposal, or re-use in processes such as highway paving or topping for a landfill. Solidification may reduce the hazard potential by means of creating a barrier between the waste particles and the environment, limiting permeability of the waste to water, or reducing the affected surface area of the waste available for diffusion. There are various types of solidification known in the art which do not incorporate chemical fixation. Moreover, the solidification of waste does not always involve a chemical process, e.g., drying, dewatering and filtration are physical processes which are sometimes considered "solidification".

Conventional chemical fixation and solidification techniques sometimes do not adequately treat wastes. Generally, these prior art fixation and solidification techniques are unsuitable for sludges and slurries containing a low percentage of solids, for example, less that ten to twenty percent by weight. Dewatering processes frequently cannot achieve a true solid and are sometimes subject to reversion to the original state by the simple addition of water. Pure absorption processes such as the addition of clays or lime suffer also from the problem of reversion to the original state. Moreover, in some wastes, the absorbed liquid phase of the waste can be squeezed out of the "solidified" material under mechanical pressure such as may occur in a landfill or even during the handling or transporting process.

The nuclear industry in the 1950's recognized the need for preventing the reversion of wastes into a liquid phase. Early methods in this industry employed simple absorption techniques such as the addition of vermiculite, or solidification by making a concrete mixture with very large quantities of Portland cement. Large quantities were required to assure that there would be no free standing water after curing of the cement. This inevitably resulted in a relatively large ratio of cement to waste, and a large volume of end waste product which must be transported and disposed. Substantial volume increases can make disposal prohibitively expensive in landfills which calculate disposal prices by volume.

Moreover, the Nuclear Regulatory Commission has stated in a preliminary draft of 10 C.F.R. Part 61 that any nuclear wastes containing liquids must be immobilized by solidification to an end product in a dry, free-standing, homogeneous, monolithic matrix which is not readily dispersible, friable, or soluble, and which contains not more than 0.5% or one gallon per container, whichever is less, of noncorrosive liquids. Under these standards, liquids that have been immobilized by only the addition of absorbent materials such as diatomaceous earth or vermiculite are not acceptable waste forms.

The cement-silicate solidification process such as disclosed in U.S. Pat. No. 3,837,872 referenced above is designed to provide a solidification waste treatment method which does not allow reversion to the liquid phase and which possesses a reduced volume of end product. The method is usable with a wide variety of wastes including those emanating from manufacturing, metal producing operations, and the like, which contain large concentrations of toxic, polyvalent metals. This cement-silicate technology was developed primarily for use with water-based, primarily inorganic wastes with low to moderate solids content (1-30%). The technology was specifically designed for use with continuous processing equipment wherein a liquid silicate solution can be added in a controlled manner so as to control the set or "gel" time. The gel time is controlled by the concentrations of cement and liquid silicate as well as the composition of the waste. In many applications, liquid silicate solidification systems have such short gel times that setting begins before the mixed waste leaves the processing equipment.

A problem with conventional cement-liquid silicate solution solidification treatment processes is that the two components of the system must be added to the waste separately since pre-mixing of such waste treatment materials would result in immediate setting thereof. The rapid setting rate of a cement and liquid silicate solidification system, together with the fact that the components must be added separately, makes the system usable only with continuous processes and very difficult to use in batch waste treatment.

The use in the prior art of a dry soluble silicate instead of a liquid silicate solution together with cement for waste treatment creates a different problem. This type of waste treatment requires more time for the gel reaction to occur since the silicate must be solubilized before it can gel. During this time, some settling of the sludge may occur in batch-processing treatment facilities or in continuous processes with low flow rates or inadequate agitation. if there is settling of the sludge prior to gel, free-standing water will occur on the top of the waste, which renders the treatment incomplete and unsatisfactory.

Another problem with the conventional cement-silicate method of waste solidification is that it is sensitive to certain waste constituents which act as inhibitors or otherwise interfere with the solidification process. The interactions between the waste constituent and the chemicals are extremely complex because many different reactions occur simultaneously, especially with wastes containing a variety of reactive pollutants.

Three general classes of interactions which have been identified include (1) reactions between the sodium silicate and the waste being treated, (2) reactions between the silicate and certain reactive components such as the calcium ion of the Portland cement, and (3) the hydrolysis and hydration reactions of Portland cement itself. These reactions and the ability of the resultant end product to encapsulate and hold waste constituents are discussed more fully in U.S. Pat. No. 3,837,872, the disclosure of which is incorporated herein by reference.

Chemical waste constituents which have been identified as solidification inhibitors fall within two basic categories: inhibitors of the cement-setting reaction, and inhibitors or precipitators of the silicate or of the cement-silicate mix. Some known cement setting inhibitors include borates; phosphates; sulfide ions; sodium arsenate; sulfates in high concentrations; oil in high concentrations; certain metal salts including lead, zinc, and copper; organics in various concentrations; and very finely divided particulate matter. Inhibitors or precipitators of the silicate or of the cement-silicate mix include ammonia or ammonium compounds, active anaerobic conditions, high concentrations of aromatic organics, pH conditions less than 4, nitrates, high concentrations of metal ions, and water soluble organics.

When any of the known inhibitors or precipitators are present in the waste being treated, the gel time of the cement-silicate mix is more difficult to predict and control. Often, free-standing water will be found on the top of the solidified waste when precipitation has occurred or when settling of certain waste constituents in the sludge occurs prior to gelling or setting. This free-standing water is a significant problem in conventional alkali metal silicate-cement solidification systems since the water can contain toxic substances in solution.

SUMMARY OF THE INVENTION

The term "counter ions", as used herein, refers to those ions that will neutralize an emulsified asphalt with an opposite charge. For example, a waste with a negatively charged counter ion, such as $SO_4^{-2}$, will react with a positively charged emulsified asphalt. The counter ions in the waste may either be in solution or they may be associated with particles in the waste suspension.

Briefly described, the present invention is a method for treating liquid and semi-liquid wastes to render them fit for ultimate disposal, by first determining the ionic charge of the waste counter ions. An appropriate suspension of emulsified asphalt particles having an opposite particle charge to the ionic charge of the waste counter ions is then selected. The waste is then mixed with the selected suspension of emulsified asphalt particles at ambient temperature in an amount sufficient to react with the waste counter ions and coalesce into a hydrophobic mass.

After mixing the selected emulsified asphalt and the waste material, the mixture will destabilize chemically causing the asphalt emulsion to "break" and solidify. The mixture is then allowed sufficient time to set and cure with the resultant end product being a solid material varying in consistency from a rock-like solid to a friable material, depending upon the particular waste treated, other additives used, the amount of emulsified asphalt used, and the relative proportions of all materials used. Addition of the emulsified asphalt to the waste material increases the hydrophobicity and decreases the water permeability of the end product.

Since asphalt in its normal state is quite hydrophobic and very impermeable to water, the asphalt-treated waste material is no longer accessible to the water in the environment. Consequently, the end product displays properties of high stability and substantial imperviousness to leaching of the waste constituents distributed throughout the solidified asphalt.

Limiting access of the leachant to the waste can be accomplished by a number of mechanisms, including rendering the individual particles hydrophobic, and rendering the whole mass less porous. The two mechanisms may also be interconnected, as when the hydrophobic nature of the particles combined with small pore size prevents water permeation, or not related as when the decrease in permeability is caused by a physical closing or filling of the pores. Regardless of the method, the result is desirable because water which cannot penetrate the body of the solid is limited to leaching only at the exposed surfaces, thus greatly diminishing the leaching rate. Another reason for desiring low permeability in a waste material is that it makes better landfill material in general and makes the waste suitable for use as a "cover" material instead of the low permeability soil or clay normally used. In many landfills, cover material has to be imported giving rise to a substantial cost.

Another advantage of this method of waste stabilization is that emulsified asphalt is widely available in bulk quantities at relatively low costs. A number of different emulsions are available which makes the formulation for specific situations much easier. The use of emulsified asphalt has the additional advantage in that the substance is in itself non-toxic. The end product is further inert to ultraviolet radiation and shows extremely high resistance to biodegradation. Because of the hydrophobicity of the asphalt structure, the end product displays low water solubility and permeability, and the mechanical and structural characteristics are suitable for disposal to landfills, ocean disposal, construction of highway roadbeds, and as cover for landfills.

The present method has a distinct advantage over the prior art in that it is relatively easy to practice since the chemical processes normally occur at ambient temperatures and pressures and without unique or special processing equipment.

Accordingly it is an object of the present invention to provide an improved method for waste treatment.

It is a further object of the present invention to provide an improved method for solidification of liquid wastes.

It is a further object of the present invention to provide a method for treating liquid and semi-liquid waste which produces a substantially solid end waste material having suitable physical characteristics for use in a landfill or other areas requiring relatively inert filler material.

It is a further object of the present invention to provide a method for treating hydrophilic liquid and semi-liquid wastes which produces an end waste product having acceptable toxicity levels as measured by currently prevailing governmental regulations concerning same.

It is a further object of the present invention to provide a method for treating hydrophilic liquid and semi-liquid wastes whose final end waste product is a solid material possessing chemical properties substantially impervious to leaching by environmental water.

It is a further object of the present invention to provide a method for treating hydrophilic liquids and semi-liquid wastes which does not undesirably increase the volume of the end waste product to the point where landfill disposal is economically not feasible.

It is a further object of the present invention to provide a method for treating hydrophilic liquid and semi-liquid wastes which is characterized by the use of a suspension of emulsified asphalt which may be premixed in desired proportions and is relatively easy to use by simple addition and mixing of the agent to the waste.

It is a further object of the present invention to provide a method for treating hydrophilic liquid and semi-liquid wastes which involves chemical processes which normally operate at ambient temperatures and pressures without unique or special equipment.

It is a further object of the present invention to provide a method for treating hydrophilic liquid and semi-liquid organic wastes.

It is a further object of the present invention to provide a method for the solidification of hydrophilic liquid and semi-liquid wastes which inhibit conventional solidification processes such as cement-sodium silicate solidification.

It is a further object of the present invention to provide an end waste product which is characterized by a relatively low volume increase, inertness to ultraviolet radiation, high resistance to biodegradation, low water solubility and permeability, and posses mechanical and structural characteristics suitable for disposal in a landfill.

These and other objects, features, and advantages of the present invention will become apparent after a review of the following detailed description of the disclosed embodiments and the appended claims.

DETAILED DESCRIPTION OF THE DISCLOSED EMBODIMENT

The method of the present invention comprises the steps of determining the ionic charge of waste counter ions. After determining the ionic charge of the waste counter ions, an emulsified asphalt suspension with particles having a particle charge opposite to the ionic charge of the waste counter ions is selected. The waste and the selected emulsified asphalt particles are then mixed at ambient temperature. The emulsified asphalt is added in an amount sufficient to react with the ionic charge of the waste counter ions and coalesce into a hydrophobic mass. The mixture of waste and asphalt is thereby converted into a physically stable hydrophobic solid end product substantially impermeable to water.

The ionic charge of the waste counter ions is determined empirically by adding cationic or anionic asphalt emulsions to small samples of waste and observing which coalesces. Alternatively, the charge on waste particles in the waste can be determined by using an electrokinetic zeta potential measuring device such as a "Zeta Meter" (Zeta Meter Corporation, New York, N.Y.). The counter ions such as $Ca^{++}$, $Mg^{++}$, $SO_4^{-2}$, polyelectrolytes, and organic flocculents can be determined analytically by conventional techniques well known to those skilled in the art. From this data, the preferred asphalt emulsion can be selected.

Asphalt is a natural constituent of most petroleums in which it exists in solution. It is a strong cement, readily adhesive, highly waterproof, and durable. Asphalt is a plastic substance that imparts controllable flexibility to mixtures of mineral aggregates. It is also highly resistant to the action of most acids, alkalies and salts. Although a solid or semi-solid at ordinary atmospheric temperatures, asphalt may be readily liquified by applying heat, or by dissolving it in petroleum solvents of varying volatility, or by emulsifying it.

Asphalt emulsions are intimate mixtures of two immiscible liquids: asphalt and water. Very fine droplets of asphalt are dispersed in water to manufacture emulsions. Chemicals emulsifying agents, compatible with asphalt and water have been added to make the products stable. Detergents are commonly used for this purpose. They form a protective film around the emulsified asphalt droplets or spheres. Also, the spheres carry an electric charge on their surface which causes them to repel one another. A satisfactory emulsion is smooth in appearance and usually brown to brownish-black in color. Emulsions are easy to handle; for example, when it is necessary to decrease their viscosities, addition of treated water is all that is usually required. This is possible because water is the dispersing or diluent phase commonly used.

The dispersed fine droplets of asphalt in the emulsion separate from the water ("break or destabilize") after either neutralization of the surface charges or removal of water by absorption or evaporation.

The emulsified asphalt used in the present invention is commercially available either as a cationic or an anionic emulsion from Ashland Petroleum Company, Pittsburgh, Pa. The asphalt is added to the waste in quantities ranging from about 0.1% by weight to about 40% by weight. After mixing the asphalt emulsion with the waste material, solidification is promoted by neutralizing the surface charge on the emulsified asphalt particles thus reducing the charge repulsion between particles, and allowing the particles to coalesce into a hydrophobic mass. In most cases, the neutralization of the asphalt particles will be accomplished by the waste material itself. However, with some waste materials, it may be necessary to add a neutralizing additive. For example, multivalent metal ions such as divalent calcium ions are preferred for neutralizing anionic asphalt emulsion. Lime is a preferred source of such calcium ions. Sulphate ions, such as found in calcium sulphate (gypsum) are a preferred neutralizing additive for cationic asphalt emulsion.

Since asphalt in its normal state is quite hydrophobic and very impermeable to water, the waste material that is distributed throughout the solid asphalt is no longer accessible to the water in the environment. Consequently, the end product displays properties of high stability and substantial imperviousness to leaching of the waste constituents distributed throughout the solidified asphalt.

The present invention is suitable for use with solid waste products such as foundry sand, which contains undesirable waste products such as mold binding agents, metals and other impurities from metal foundry processes. The emulsified asphalt is mixed with the waste sand and is allowed to solidify. The resulting solid mass may now be disposed of in a conventional manner such as burial or even as a landfill cover.

The present invention is especially suitable for solidifying wastes which inhibit the chemical reactions of conventional solidification processes. For example, cement-alkali metal silicate solidification systems have been found to be readily adaptable to a large variety of water-based wastes. One such solidification process is described in my copending U.S. patent applicaton No. 510,152, filed June 30, 1983, now abandoned, which is incorporated herein by reference. However, these solidification systems have been found to be sensitive to certain waste constituents which act as inhibitors or otherwise interfere with solidification. When any of the known inhibitors or precipitators are present in the waste being treated, the gel time of the cement-silicate mix is often difficult to predict and control. Addition of emulsified asphalt to the conventional solidification system will substantially improve the end product in that it will be highly hydrophobic, substantially impermeable to water, and will not produce a supernatant liquid during the solidification process.

The resultant solidified end product displays other properties which make the treated waste suitable for various final disposal users. For example, the lowered permeability and susceptibility to leaching renders the solidified waste suitable for use in a landfill. The end product formed from the present invention is thermodynamically and kinetically stable under normally encountered ambient temperatures and pressures. Consequently, such environmental factors as ground water activity, wind and rain erosion, biological degradation, and ultraviolet radiation only minimally affect the solidified waste product. If the solidified waste is to be buried or covered as is normally the case, then the effects of erosion and ultraviolet radiation do not apply. The use of asphalt as a solidification agent provides a strong imperviousness to the affects of ambient ground water and also to biological degradation. Consequently, the waste product formed by practice of the present invention can be expected to change very slowly in the ground as a function of time, on a scale similar to that of natural tars and minerals. Moreover, the stable material is substantially impervious to leaching of the waste constituents as determined by currently required governmental leaching tests.

EXAMPLE I

Several samples of wastes with different counter ions are tested with a cationic asphalt. The cationic asphalt used in these tests is CRS-2 rapid setting asphalt (Central Oil and Asphalt Corporation, Douglas, Ga.) emulsion diluted 1:1 with deionized water. In each sample, the diluted emulsion is mixed rapidly into the test solution in equal proportions and observed for coalescence after thirty seconds, twenty minutes and sixteen hours.

TABLE 1

| Test reagent | Counter ion or particle | Results after[a] | | |
|---|---|---|---|---|
| | | 30 sec | 30 min | 16 hours |
| Deionized water | none | N | N | N |
| Tap water | unknown | N | slight C | C |
| Magnifloc 835 A | Anionic polymer | C | C | C |
| Tergitol 7 | Anionic polymer | C | C | C |
| 10% Hydrochloric Acid | $Cl^-$ | N | N | N |
| 10% Sulfuric Acid | $SO_4^{-2}$ | N | C | C |
| 5% Calcium Chloride | $Ca^{+2}$ | N | N | N |
| 10% Sodium Hydroxide | $OH^-$ | C | C | C |
| 10% Sodium Sulfate | $SO_4^{-2}$ | C | C | C |

[a] N = No coalescence
C = Coalescence

As shown, $SO_4^{-2}$, $OH^-$ and anionic polymer particles are effective "counter ions" for causing the coalescence of a cationic asphalt emulsion. The $Cl^-$ was not effective in causing the asphalt to coalesce. The cationic counter ion $Ca^{+2}$ has no effect on the cationic asphalt emulsion.

As shown in this test, by first analyzing the waste to be treated, it is possible to determine what emulsion to use. Thus a strong base requires a cationic asphalt emulsion, a calcium brine requires an anionic asphalt emulsion, a gypsum sludge ($CaSO_4$) requires either a cationic or anionic asphalt emulsion since two strong, opposite counter ions ($Ca^{+2}$ and $SO_4^{-2}$) are present in the waste.

While most wastes will contain effective cationic or anionic counter ions, it is possible that a particular waste may have equal concentrations of strong cationic and anionic counter ions. These wastes can be treated according to the present invention by adding a small amount of counter ion to the waste to neutralize the charges on the asphalt. For example, a waste that does not have enough indigenous counter ion can be treated with a small amount of calcium chloride to increase the concentration of cationic counter ion and cause the desired coalescence.

EXAMPLE II

A water-based organic waste consisting of 9.2% sodium chloride, 1.6% sodium sulfate, 0.8% ammonium chloride, 0.2% diethylene glycol, and 195 ppm antimony was mixed with the following standard Portland cement-sodium silicate solidification systems.

A. 0.67 lb/gal. Portland cement + 2% Sodium silicate solution (5% volume increase)
B. 1.0 lb./gal. Portland cement + 2% Sodium silicate solution (6% volume increase)
C. 1.33 lb./gal. Portland cement + 4% Sodium silicate solution (7% volume increase)
D. 2.0 lb./gal. Portland cement + 4% Sodium silicate solution (12% volume increase)

The above waste mixture was found to be very difficult to solidify using these Portland cement-sodium silicate solution systems. The mixture is separated after treatment, giving a soft to hard sediment and a supernatant water layer.

An emulsified asphalt solution was prepared from Ashland Petroleum Company's CMS-2 cationic emulsified asphalt. Three parts asphalt were mixed in a Waring blender with two parts water and one part Photo-Flo 200 wetting agent to produce the stock solution used in the following experiment. The final concentration of asphalt in the stock solution was 5% by weight. A wetting agent is a chemical that aids in the dispersion of organic wastes in the solidification process. In each case, the asphalt solution was added in the proportion of 10% by volume to the waste. The following results were obtained after mixing the ingredients with the waste and allowing the mixture to cure for 96 hours at ambient temperature and approximately 95% relative humidity. The waste treated with emulsified asphalt was, in all cases, harder than the untreated waste and did not exhibit supernatant water. Furthermore, it was impossible to prevent the formation of a liquid supernatant without the addition of emulsified asphalt, even with large additions of cement and sodium silicate solution. The average volume increase after addition of the asphalt solution was 10%.

|  | A & B | C | D |
| --- | --- | --- | --- |
| Waste Alone | Very soft, supernatant | Very soft, supernatant | Very soft, supernatant |
| Waste plus | Soft, no | Firm, no | Very hard, |

|  | A & B | C | D |
| --- | --- | --- | --- |
| 10% by volume of emulsified asphalt solution | supernatant | supernatant | supernatant |

EXAMPLE III

A series of tests were performed to determine the wettability of various solidification combinations with and without emulsified asphalt additions. The first three samples described below were made up using water as the "Waste". The fourth sample was an actual waste from a battery manufacturing process which waste contained lead. The formulations used in the four tests were:

1. 25 mls. water + 5 gms. Portland cement + 2 mls. sodium silicate solution. The mixture was cured for 33 days. (Volume increase was 15%).
2. 25 mls water + 0.5 mls. emulsified asphalt (Grade CMS-2) + 2 mls. sodium silicate solution + 5 gms. Portland cement. The mixture was cured for 33 days. (Volume increase was 18%).
3. 25 mls. water + 2.0 mls. emulsified asphalt (Grade CMS-2) + 2 mls. sodium silicate solution + 5 gms. Portland cement. The mixture was cured for 33 days. (Volume increase was 24%).
4. 25 mls. battery waste + 12 gms. Portland cement + 1.0 ml emulsified asphalt (Grade CMS-21) + 0.25 mls. Triton X-100 wetting agent. The mixture was cured for 33 days. (Volume increase was 24%).

The wettability of each sample was determined by dropping water droplets onto the horizontal surface of each test sample and observing subjectively whether the surface became covered by a continuous water film (wettable) or by discrete droplets (non-wettable). Water absorption was determined subjectively by whether the water flowed off the edge of the sample without penetrating or was absorbed readily into the sample through the surface.

Test results were as follows:

| SAMPLE | OBSERVATION |
| --- | --- |
| 1. | Water wets the surface and is absorbed rapidly into the sample. |
| 2. | Water wets the surface after some period of time, but is not absorbed. Volume increase of the sample after addition of asphalt was 2%. |
| 3. | Water does not wet the surface and is not absorbed. Volume increase of the sample after addition of asphalt was 3%. |
| 4. | Water wets the surface, but is not absorbed. Volume increase of the sample after addition of asphalt was 4%. |

Samples 2, 3 and 4 show that the emulsified asphalt is effective in preventing wetting and absorption, in comparison with the control sample 1 (no asphalt added).

EXAMPLE IV

A waste foundry sand was treated in various ways with the purpose of decreasing its permeability to water. This sand contained mold binding agents, metal, and other impurities from the metal foundry process. A "falling head" permeability test was set up according to standard methods used in this discipline ("Laboratory Soil Testing Manual", U.S. Army Corp. of Engineers, EM 1110-2-1906, Nov. 30, 1970). The coefficient of permeability (k) was calculated as follows:

$$k = \frac{LA}{A_t} \ln \frac{h_0}{h_f} = 2.303 \frac{LA}{A_t} \log 10 \frac{h_0}{h_f}$$

where:
- a = inside area of standpipe
- L = length of specimen
- A = cross-sectional area of specimen
- $h_0$ = height of water in standpipe above discharge level minus $h_c$ at $t_0$
- $h_f$ = height of water in standpipe above discharge level minus $h_c$ at time, $t_f$
- t = elapsed time, $t_f - t_0$
- $h_c$ = height of capillary rise The coefficients of permeability were measured for the following experimental formulations of foundry sand and solidifications of foundry sand and solidification agents. In each case, the mixtures were made and then compacted into the sample tube of the permeability measuring apparatus. The test was then run and the coefficient calculated; the smaller the coefficient, the lower is the permeability.

1. 125 gms. foundry sand with no additives. This is the control sample. The test was performed three times and the average value for the coefficient of permeability was computed. $k = 3.6 \times 10^{-3}$ cm./sec.
2. 125 gms. foundry sand + 10 mls. water + 5 mls. emulsified asphalt solution (1 part water to 1 part CRS-2 emulsified asphalt, rapid set, cationic grade). The mixture was cured for 7 days at ambient temperature and humidity. $= 4 \times 10^{-7}$ cm./sec.
3. 125 gms. foundry sand + 10 mls. water + 2.5 mls CRS-2 emulsified asphalt (no dilution). Cured for 5 days at ambient temperature and humidity. $k = 1.7 \times 10^{-6}$ cm./sec.
4. 125 gms. foundry sand + 0 mls. water + 5 mls. CRS-2 emulsified asphalt (no dilution). The mixture was cured for 5 days at ambient temperature and humidity. $k = 1.6 \times 10^{-6}$ cm./sec.

The results of these experiments show that the permeability of foundry sand can be decreased by at least 2 to 3 orders of magnitude by treatment with emulsified asphalt. This would result in a much lower leaching rate for the waste material and brings the absolute value of "k" close to the $1 \times 10^{-7}$ cm./sec. required in many cases for landfill cover material. No volume increase was observed after addition of the asphalt to the foundry sand because the asphalt fills the interstitial spaces between the sand particles.

It should be understood, of course, that the foregoing relates only to a preferred embodiment of the present invention and that numerous modifications or alterations may be made therein without departing from the spirit and the scope of the invention as set forth in the appended claims.

I claim:

1. A method of treating hydrophilic liquid and semi-liquid wastes to render them fit for ultimate disposal in a solid mass, comprising the steps of:
   determining the ionic charge of counter ions in the waste;
   selecting a suspension of emulsified asphalt particles having an opposite particle charge to the ionic charge of the counter ions;
   admixing the selected suspension of emulsified asphalt particles with the waste at ambient temperature in an amount sufficient to neutralize the ionic charge of the asphalt particles and coalesce the admixture into a hydrophobic mass, the final concentration of the suspension of emulsified asphalt particles being between approximately 0.1% and 40% by weight of the waste treated,
   whereby the admixture of waste and asphalt is converted into a physically stable hydrophobic solid end product substantially impermeable to water.

2. The method of claim 1, wherein said emulsified asphalt is a cationic emulsified asphalt.

3. The method of claim 1, wherein said emulsified asphalt is an anionic emulsified asphalt.

4. The method of claim 1, comprising the step of adding a neutralizing material to adjust the ionic charge of the waste counter ions to react with the selected suspension of emulsified asphalt particles.

5. The method of claim 4, wherein said neutralizing material is selected from a group comprising anionic materials and cationic materials.

6. The method of claim 1, wherein the hardening of the emulsion of asphalt is caused by the removal of water.

7. The method of claim 1, wherein a solidification agent is admixed with said waste and said emulsified asphalt.

8. The method of claim 7, wherein said solidification agent comprises cement and alkali metal silicate.

9. The method of claim 8, wherein said alkali metal silicate comprises sodium silicate.

10. The method of claim 8, wherein said cement comprises Portland cement.

11. The method of claim 1, wherein the amount of said emulsified asphalt added is in the range of from about 0.1% to about 20% by weight of waste treated.

* * * * *